United States Patent
Black (10) Patent No.: US 7,076,547 B1
(45) Date of Patent: Jul. 11, 2006

(54) SYSTEM AND METHOD FOR NETWORK PERFORMANCE AND SERVER APPLICATION PERFORMANCE MONITORING AND FOR DERIVING EXHAUSTIVE PERFORMANCE METRICS

(75) Inventor: Damian S. Black, San Francisco, CA (US)

(73) Assignee: Amdocs (Israel) Ltd., Ra'anana (IL)

( * ) Notice: Subject to any disclaimer, the term of this patent is extended or adjusted under 35 U.S.C. 154(b) by 659 days.

(21) Appl. No.: 10/177,657

(22) Filed: Jun. 20, 2002

Related U.S. Application Data (60) Provisional application No. 60/300,271, filed on Jun. 21, 2001.

(51) Int. Cl.
*G06F 15/173* (2006.01)

(52) U.S. Cl. .................................... 709/224
(58) Field of Classification Search ............... 709/224
See application file for complete search history.

(56) References Cited

U.S. PATENT DOCUMENTS

| | | | | |
|---|---|---|---|---|
| 5,878,420 | A * | 3/1999 | de la Salle ................... | 707/10 |
| 5,958,009 | A * | 9/1999 | Friedrich et al. ............ | 709/224 |
| 6,003,079 | A * | 12/1999 | Friedrich et al. ........... | 709/224 |
| 6,108,700 | A * | 8/2000 | Maccabee et al. .......... | 709/224 |
| 6,363,056 | B1 * | 3/2002 | Beigi et al. ................. | 370/252 |
| 6,807,156 | B1 * | 10/2004 | Veres et al. ................. | 370/252 |
| 6,816,456 | B1 * | 11/2004 | Tse-Au ..................... | 370/230.1 |
| 6,831,890 | B1 * | 12/2004 | Goldsack et al. ........... | 370/229 |
| 6,839,751 | B1 * | 1/2005 | Dietz et al. ................. | 709/224 |
| 2001/0051931 | A1 * | 12/2001 | Schweitzer | |
| 2001/0054024 | A1 * | 12/2001 | Schweitzer | |
| 2002/0038364 | A1 * | 3/2002 | Schweitzer | |

FOREIGN PATENT DOCUMENTS

| | | | |
|---|---|---|---|
| WO | 9927556 A2 * | 6/1999 | |
| WO | 9927556 A3 * | 6/1999 | |
| WO | 0101272 A2 * | 1/2001 | |
| WO | 0101272 A3 * | 1/2001 | |
| WO | 0109716 A2 * | 2/2001 | |
| WO | 0109716 A3 * | 2/2001 | |

* cited by examiner

*Primary Examiner*—Rupal Dharia
*Assistant Examiner*—Nicholas Taylor
(74) *Attorney, Agent, or Firm*—Zilka-Kotab, PC (57) ABSTRACT

A method for network performance and server application performance monitoring in at least one of the probes in a system having one or more distributed probes and one or more analyzers coupled to a network is disclosed. Configuration information is installed into one or more of the probes. The arrival at the probe of a flow instance of interest is detected based on the configuration information. The probe determines whether arriving flow instance is a new flow instance. If the arriving flow instance is a new flow instance, a state associated with the flow instance is established with the probe. The probe captures relevant information associated with the flow instance and it is determined whether an end of the flow has been reached. Flow monitoring continues until the end of the flow has been reached.

17 Claims, 5 Drawing Sheets

SYSTEM AND METHOD FOR NETWORK PERFORMANCE AND SERVER APPLICATION PERFORMANCE MONITORING AND FOR DERIVING EXHAUSTIVE PERFORMANCE METRICS

RELATED APPLICAITON

The present application claims priority from U.S. Provisional Patent Application Ser. No. 60/300,271, to Damian S. Black, filed Jun. 21, 2001, and entitled "SYSTEM AND METHOD FOR NETWORK PERFORMANCE AND SERVER APPLICATION PERFORMANCE MONITORING AND FOR DERIVING EXHAUSTIVE PERFORMANCE METRICS", the entire disclosures of which are incorporated herein by reference.

FIELD OF THE INVENTION

The present invention relates to server application performance, and more particularly to deriving exhaustive performance metrics.

BACKGROUND OF THE INVENTION

The low cost of Internet connectivity and the wide range of services available over the Internet are driving the deployment of TCP/IP networks. This process has led to a new market of client-server applications that enables the user to interact with other users and computer systems around the world. The development of Internet connectivity has contributed to a need for network activity monitoring and measurement. This need has become especially acute, however, given the recent popularity of the Internet and other internets—an "internet" being any plurality of interconnected networks which forms a larger, single network. With the growth of networks used as a collection of clients obtaining services from one or more servers on the network, it is increasingly important to be able to monitor the use of those services and to rate them accordingly. Such objective information, for example, regarding which services (i.e., application programs) are being used, who is using them, how often they have been accessed, and for how long, is very useful in the maintenance and continued operation of these networks. It is especially important that selected users be able to access a network remotely in order to generate reports on network use and to monitor network and server performance in real time. Similarly, a need exists for a real-time network monitor that can monitor and measure network performance in real time.

SUMMARY OF THE INVENTION

The disadvantages associated with the prior art are overcome by a method for network performance and server application performance monitoring in at least one of the probes in a system having one or more distributed probes and one or more analyzers coupled to a network. Configuration information is installed into one or more of the probes. The configuration of the probes may be carried our statically or dynamically. The arrival at the probe of a flow instance of interest is detected based on the configuration information. The probe determines whether arriving flow instance is a new flow instance. If the arriving flow instance is a new one, then the probe will establish a state associated with the flow instance. The probe captures relevant information associated with the flow instance and export it to an external system for further analysis. The probe also determines whether an end of the flow has been reached. If the end of the flow has been reached, the state may be removed and the information may be exported. If the end of the flow has not been reached, flow monitoring continues.

The relevant information associated with the flow instance may include timestamps, probe identifiers, flow identifiers, sequence numbers, flow information or flow statistics. The flow instance may include a single packet, a stream of packets that constitute a message and a stream of packets that constitute a session. Moreover, the flow instance may be defined based on rules specified by the analyzer to meet the monitoring or measurement requirements.

A record may be constructed from the captured flow information and the record may be exported to one or more analyzers. Configuration information may also be installed on the analyzers. The configuration information installed on the analyzers or probes may include flows that need to be monitored, flow instances that need to be captured, or sets of performance metrics that need to be measured. Flow information and/or statistics may be provided from one or more of the probes to one or more of the analyzers. The flow information in such a case may pertain to on-going monitoring activities or to one or more flows that have terminated.

One or more of the analyzers may use flow matching to uniquely associate events observed at various probes with a single flow instance, and perform a set of operations on the data based on the configuration policy. For example, the analyzer(s) may produce performance reports. Such performance reports may include Quality of Service (QoS) metrics or derived statistics. Examples of such QoS metrics include, but are not limited to CS Msg Jitter, SC Msg Jitter, CS Strm Jitter, SC Strm Jitter, CS ERT SS, SC ERT SS, CS ERT ES, SC ERT ES, CS ERT SE, SC ERT SE, CS ART SS, SC ART SS, CS ART ES, SC ART ES, CS ART SE, SC ART SE, Conn Establish, Conn Graceful Term, Conn Timeout Term, CS Conn Window, SC Conn Window, CS Hop Count, and SC Hop Count. The derived statistics may include such statistics as Number of Data Points, Frequency, Maximum, Minimum, Range, Arithmetic Mean, Root Mean Square, Variance, Standard Deviation, and/or Trending.

The flow matching may proceed by determining a flow instance that needs to be matched; determining one or more down stream probes where a corresponding flow instance may appear; and determining a time window in an optimal way that considers the characteristics of the flow instance. All the flow instances falling into the time window may be searched at all the down stream probes. If any records characterized by the same flow identifier and sequence number are found, then a matching flow instance was obtained. By matching flow instances, various events may be associated with the flow instance of interest, and one or more network or server application QoS metrics may be derived.

Embodiments of the method described above may be implemented as a set of processor readable instructions that are executable on a processor of one or more of the probes. Such instructions may be stored in a suitable processor readable medium.

DESCRIPTION OF THE PREFERRED EMBODIMENTS

Figure 1:
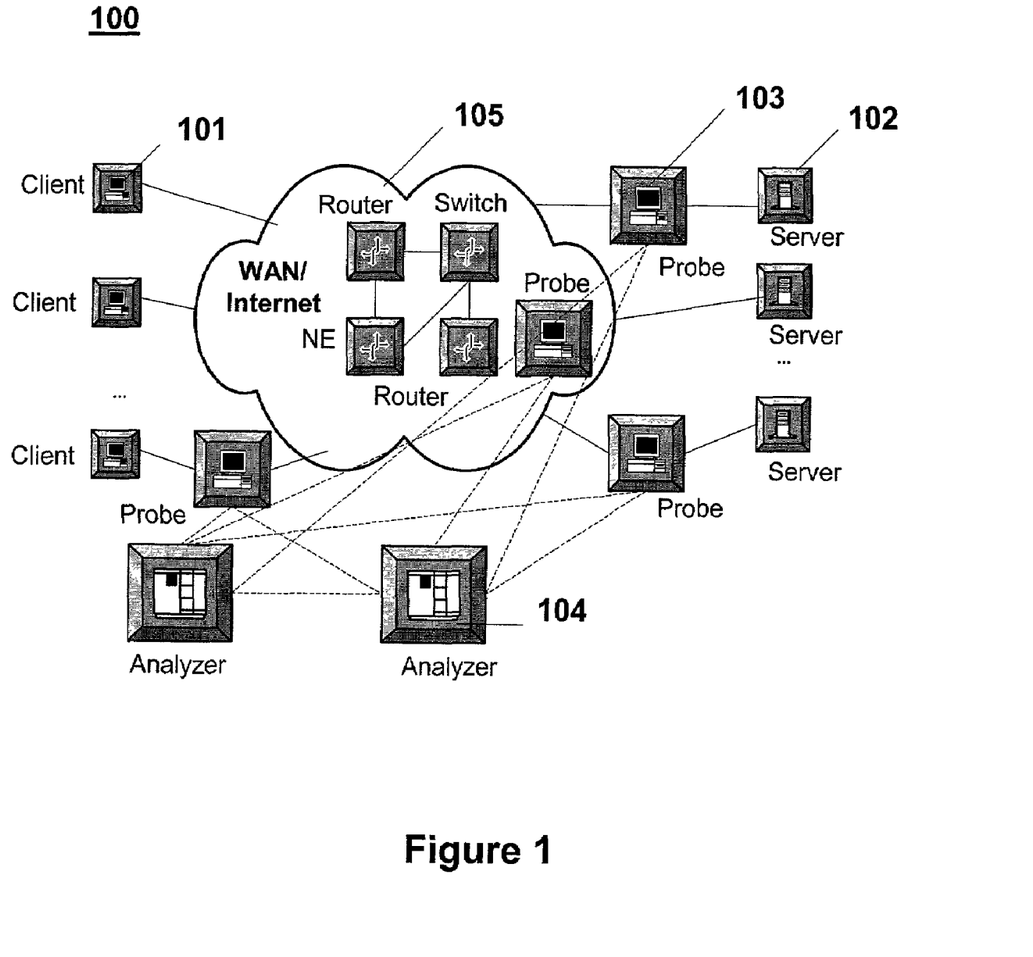
FIG. 1 is a functional diagram illustrating an example of network architecture and topology that may be used with embodiments of the present invention.

FIG. 1 is a functional diagram illustrating exemplary architecture and topology of a system 100 embodying the present invention. The major components of the system include Clients 101, Servers 102, Probes 103, Analyzers 104, and the Network 105. The Network 105 includes of a set of interconnected network devices, e.g. routers, switches, etc. to facilitate communication among end systems, e.g., clients 101 or servers 102, attached to it. The Clients 101 are end systems attached to the Network. They facilitate end-users' access to the Network, and various services offered by Servers. The Servers 102 are end systems attached to the Network 105. The Servers 102 provide various services to an end-user, e.g. Internet portal, e-mail access, web hosting, authentication and authorization, ASP, etc. For certain measurements, embodiments of the present invention may require all the Probes 103 to be synchronized with high precision. This may be achieved through a global positioning satellite (GPS) system having one or more satellites communicating to the probes 103 and/or each other.

The Probes 103 are monitoring devices that may be attached to any strategic monitoring point within the system 100. Strategic monitoring points may be determined based upon what segments of the Network 105 and/or what server application performance are of interest. The functions performed by the Probe 103 may include configuration management; flow data collection, and control functions for handling communication with the Analyzers 104.

The analyzers 104 are central processing devices that perform functions including, but not limited to flow data matching and QoS metrics computation. The Analyzers 104 may also implement control functions for communication, provision, and remote monitoring of the probes 103. Any of the Analyzers 104 may rout information among the Analyzers 104. Furthermore any of the Analyzers 104 may serve as an interface for users of the system 100. Redundant analyzers 104 may be deployed within the system to improve reliability. The analyzers 104 may be connected to all the monitoring devices, e.g., probes 103 either through a separate management network, or integrated with the Network 105 that carries user traffic. An Analyzer 104 may route information to other Analyzers based on policies established during the configuration. Different Analyzers 104 may be responsible for computing different performance metrics related to a flow instance. However, an Analyzer 104 may also function as a gathering point for information collection. There may be cases that an Analyzer 104 may perform simple information collection and forward for some flow instances. The different roles performed by an Analyzer 104 is configurable based on some policies specified by the user/operator.

Figure 2:
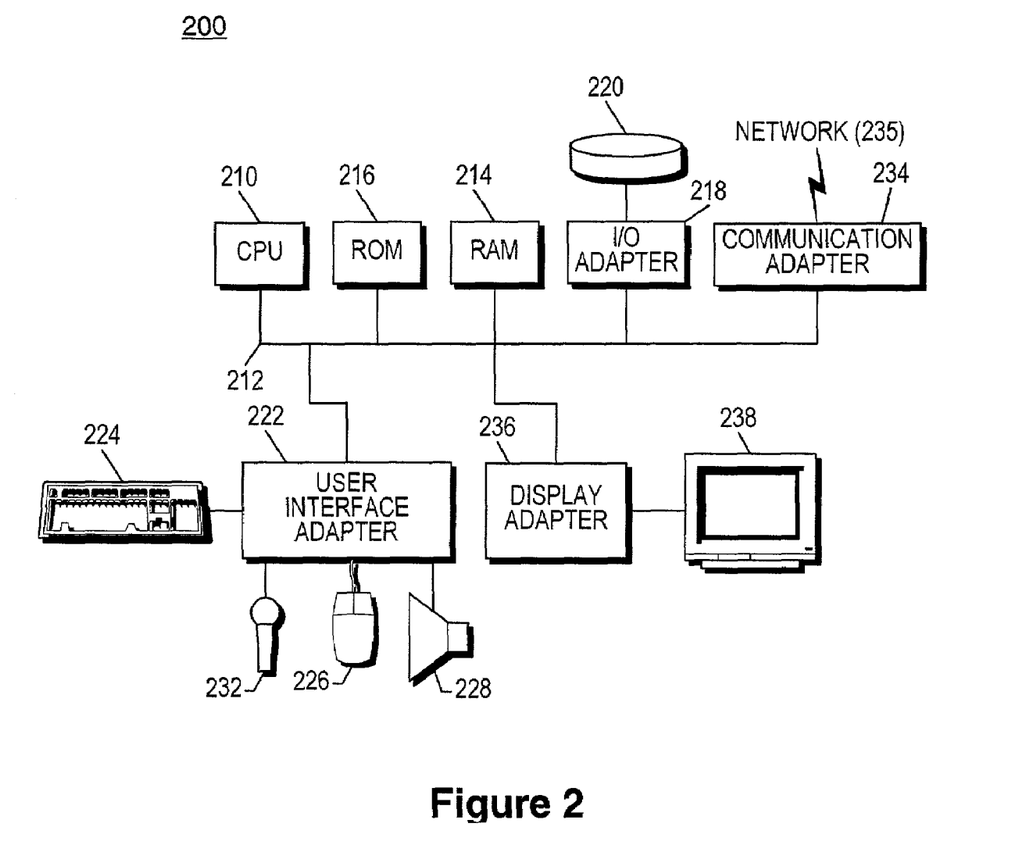
FIG. 2 shows a representative hardware environment which may be associated with the foregoing components, in accordance with one embodiment.

The Probes 103 Analyzers 104 may each be computing systems of the type shown in FIG. 2. FIG. 2 shows an example of a hardware environment that may be associated with the foregoing components, in accordance with one embodiment. FIG. 2 depicts a typical hardware configuration of a workstation 200 that may be utilized as one of the probes 103 or analyzers 104 of FIG. 1. The workstation 200 includes a central processing unit 210, such as a microprocessor, and a number of other units interconnected via a system bus 212. The workstation 200 may further include a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that embodiments of the present invention may also be implemented on platforms and operating systems other than those mentioned. Embodiments of the present invention may be written using JAVA, C, and/or C++ language, or other programming languages, along with an object oriented programming methodology. Object oriented programming (OOP) has become increasingly used to develop complex applications.

It should also be noted that embodiments of the present invention may be used in combination with any desired architecture. Another exemplary architecture may be found with reference to PCT application WO9927556A2 entitled "NETWORK ACCOUNTING AND BILLING SYSTEM AND METHOD" published Jun. 3, 1999, and which is incorporated herein by reference in its entirety.

Figure 3:
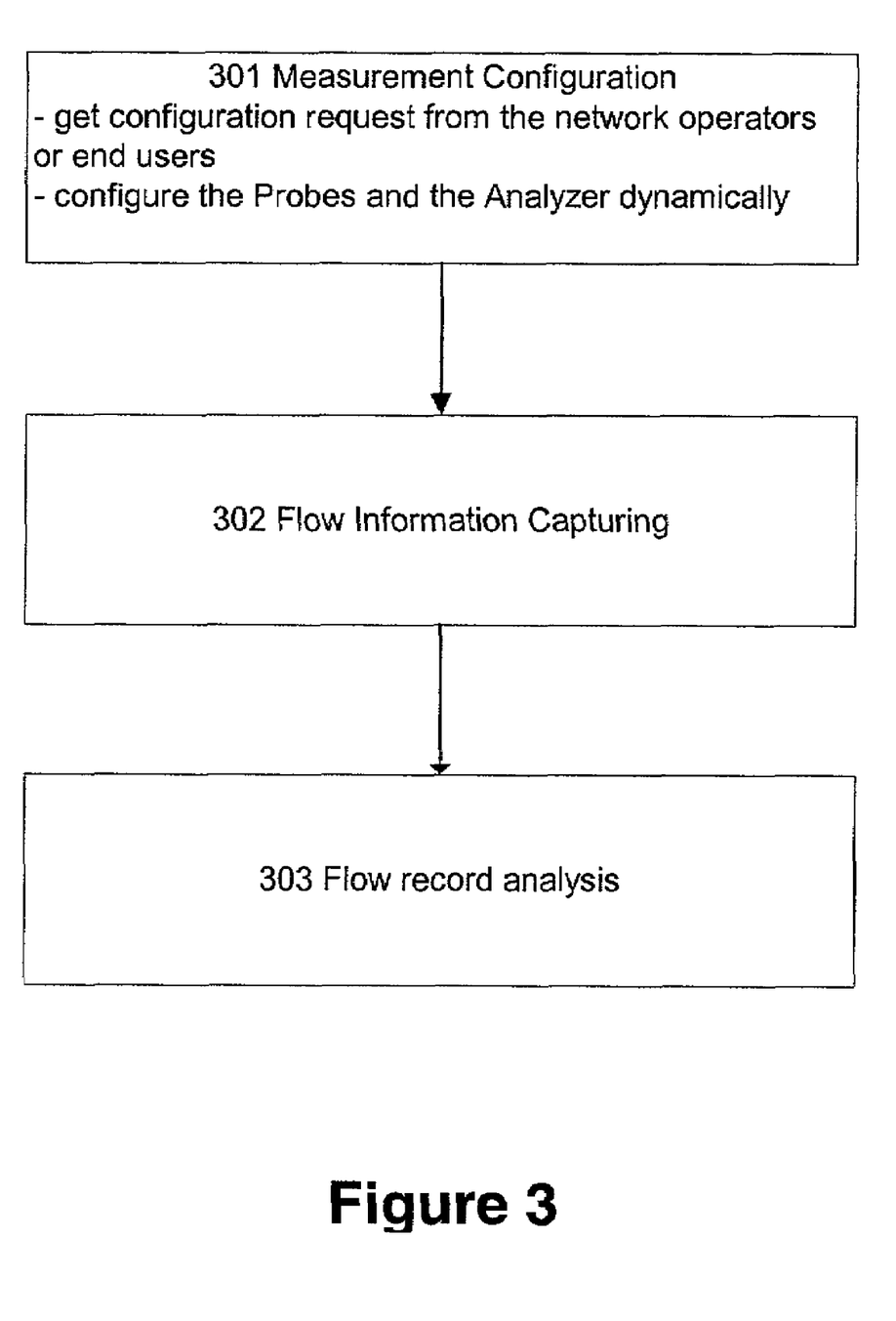
FIG. 3 illustrates operations by which the present invention derives network and server application performance.

In use, embodiments of the present invention may derive network and server application performance on operations such as those outlined by the flow diagram depicted in FIG. 3. Referring to both FIG. 1 and FIG. 3, at 301, a system, e.g. the system 100 of FIG. 1, can be optionally provisioned in a dynamical fashion by loading configuration information into the Probes 103 and the Analyzers 104. At 302, the Probes 103 in real-time collect flow information, derive relevant statistics, and export the information in the form of records to the Analyzers 104 based on the configuration information. At 303, one or more of the Analyzers 104 in real-time process input records from the Probes 103. The Analyzer 104 may correlate the inputs and generate performance metrics based on the configuration information.

The Analyzer 104 may optionally route the input records to other analyzers where further processing will be carried out.

Definitions

In the context of embodiments of the present invention, a "flow" refers a stream of data packets that carry information between end systems, e.g., clients 101 and servers 102. A flow may be associated with a single application running on an end system, or a set of applications running on an end system, or end systems (typically a pair of end systems uniquely identified by network addresses). Flows may be aggregated based on certain criteria that represent information from multiple end systems (e.g. end systems within an enterprise network that may be identified by a network address), this sometimes is referred as aggregated flows or super flows. There are many ways to identify a flow. By way of example, in the context of embodiments of the present invention, a "flow type" is specified by an n-tuple that consists of n attributes. Examples of flow types include but are not limited to the following:

Example 1

IP Flows (2-Tuple)

An IP flow can be identified by the source and destination address embedded in an IP packet.

Example 2

Transport Flows (4-Tuple)

A transport flow can be identified by the source address, source port number, destination address, and destination port number embedded in an IP packet.

Example 3

Application Flows (5-Tuple)

An application flow can be identified by the source address, destination address, protocol identifier, source port number (if needed), and destination port number (if needed) embedded in an IP packet.

To monitor network and server application performance, embodiments of the present invention may be concerned with flow instances. A flow instance is identified by the flow type and temporal information associated with the generation of the flow.

Typical temporal information may include the generation time of a data packet, or the start/stop time of an application message. Another form of temporal information can be a sequence number embedded in flow instance. By monitoring and capturing information related to flow instances, the present invention is capable of deriving exhaustive quality of service (QoS) metrics pertaining to network performance and server application performance.

Examples of flow instances include, but are not limited to:
 a single packet
 a stream of packets that constitute a message
 a stream of packets that constitute a session
 or some other ways such as a set of packets sharing one or more common properties, e.g. a set of packets associated to a single enterprise user.

Flow instances may be encapsulated. For example, a flow instance pertaining to a session may include flow instances related to messages exchanged during the session; a flow instance pertaining to a message may include flow instances related to data packets constituting the message.

Flow Monitoring Configuration

In embodiments of the present invention, collection of flow information and associated data analysis can be optionally configured dynamically based upon requirements from any party that is interested in obtaining performance metrics. The configuration information may include—
 Flows that need to be monitored
 Flow instances that need to be captured
 A set of performance metrics that need to be measured In one embodiment of the invention, a network operator may provide monitoring requirements to the Analyzers 104. The Analyzers then generate the monitoring plan based on the requests, configure routing policies in the analyzers and configure all the Probes to extract relevant information.

In another embodiment of the invention, the end user may be interested in the performance of communication services rendered by the operators that provide the service, or performance of applications provided by Servers. The end user can request QoS metrics associated with some access sessions, or message transmissions; these requests may be communicated to the Analyzers 104 through mechanisms including, but not limited to, signaling, or network management. The Network 105 may then in turn route the requests to the Analyzers 104 that trigger the configuration of the "Monitoring" service. The Analyzer 104 may generate a report of performance metrics, and provide it to the end user. Embodiments of the present invention can thus can act as a server provider that provides QoS monitoring service to any interested party.

Flow Instance Capture

Figure 4:
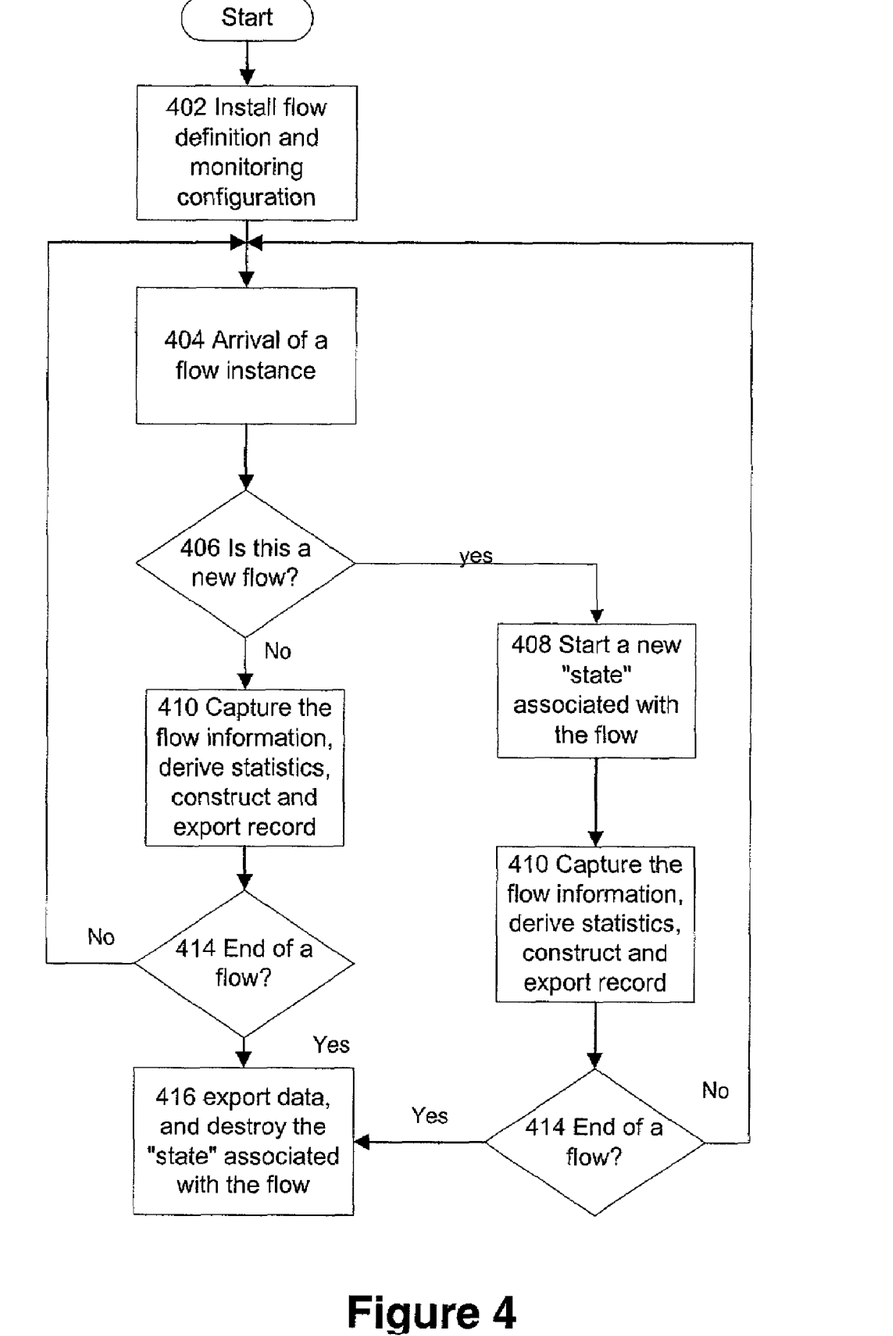
FIG. 4 is a flow diagram illustrating an example of procedures related to flow instance capturing in a probe according to an embodiment of the invention.

In the present invention, the Probes 103 may passively collect information pertaining to flow instances. FIG. 4 is a flow diagram illustrating exemplary procedures related to flow instance capturing in a Probe 103. For certain measurements, the present invention may require all the Probes 103 to be synchronized with high precision. This may be achieved through a GPS satellite system.

Referring to both FIG. 1 and FIG. 4, at 402, the configuration information may be installed dynamically in one or more of the Probes 103. The configuration information may include the definition of flow instances that one or more of the Probes 103 need to monitor, a set of monitoring policies that specifies the required operations on the collected data, etc. At 404, a Probe 103 may passively monitor data streams that pass by and detect the arrival of any flow instance of interest. At 406, the Probe 103 determines whether an arriving flow instance is a new one. If so, in 408, the Probe establishes a state associated with the flow instance. At 410, the Probe 103 captures relevant information associated with the flow instance. By way of example, the Probe 103 may attach a timestamp associated with the arrival of the flow instance, and derive relevant statistics, e.g. start counting the number of packets received, etc, and construct a record and export the record to one or more of the Analyzers 103 if needed. If the flow instance is associated with a pre-existing one, in 412, the Probe 103 captures relevant information associated with the flow and derives relevant statistics, and constructs a record and exports it to one or more of the Analyzers 104 if needed. At 414, the Probe 103 decides whether the end of a flow has reached, if so, in 416 the state is destroyed and the information is exported. Otherwise, it continues monitoring the flow.

The information associated with a flow instance may include—
 Time a data packet arrives at the Probe
 Time the first data packet belonging to a message arrives at the Probe
 Time the last data packet belonging to a message arrives at the Probe
 The size of a data packet in octets
 The size of an application message in number of data packets
 The size of an application message in octets Based upon the captured information associated with flow instances, the Probe can compute various statistics associated with the flow. Some examples of statistics that may be derived at the Probes 103 include—

| | |
|---|---|
| N | number of events (for example, number of data packets) |
| $\Sigma X$ | sum of all values (for example, total amount of data in all packets) |
| $\Sigma(X^2)$ | sum of the squares of each value |
| $X_{max}$ | largest value seen (e.g., largest amount of data seen in a packet) |
| $X_{min}$ | smallest value seen (e.g., smallest amount of data seen in a packet) |
| $\Sigma(IX)$ | sum of each sequence index (1, 2, . . . n) times its corresponding value |

The Probes 103 may include the flow instance information and various statistics in a Record, and export the Record to the Analyzer using some reliable communication protocol. The format of the Record may be—

Probe Identifier—it identifies the flow within the system. The Analyzers 103 may maintain the architecture and topology information of the system 100, and can pinpoint the monitoring point to where the Probe 103 is attached.

Flow Identifier—it is a set of attributes that uniquely identify the source and destination of the flow, if may also include the protocol and session information.

Sequence Number—it identifies the relative position of the flow within a flow

Timestamp—it represents the time when the event associated with the flow is observed at the Probe 103.

Flow Information—it is the information associated with a flow collected by the Probes 103.

Flow Statistics—it is some statistics derived by the Probes based on flow information.

Optionally, the Probes 103 may sample the flow instances instead of collecting information based upon some configurations. Sampling reduces the amount of information needs to be collected and processed at the Probes 103. It may be necessary when the Probes 103 are attached to high-speed links. Through sampling, the Probes 103 may generate statistics leading to the statistical estimation of QoS metrics pertaining to flows. As an example, based upon configuration, the Probes 103 may be able to derive an un-biased estimator of a QoS parameter and its associated confidence interval.

Flow Information Analysis

Records constructed by the Probes 103 may be communicated directly or routed through some Analyzers 104 to the Analyzer that will perform centralized processing and analysis. However, it should be noted that Probes 103 may provide information in any form.

Figure 5:
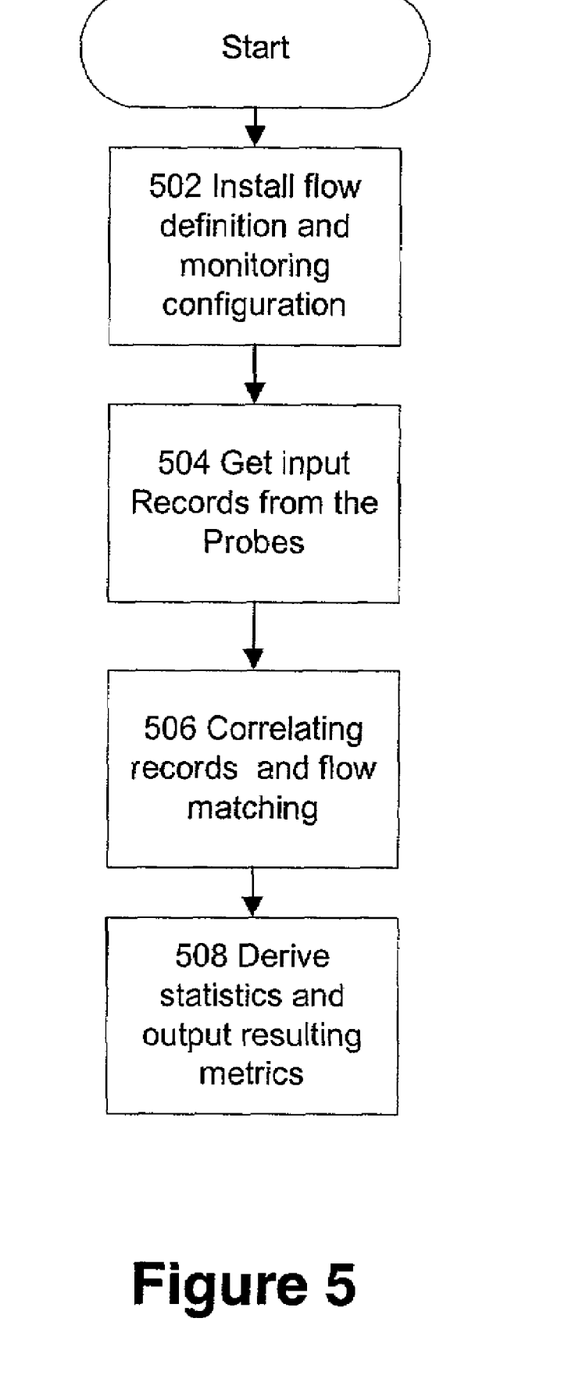
FIG. 5 illustrates on example of information analysis carried out in an Analyzer.

Based on the input information, the Analyzer 104 may derive any QoS metrics that are of interest. FIG. 5 depicts a flow diagram illustrating on example of information analysis carried out in the Analyzer 104. Referring to FIG. 1 and FIG. 5, at 502, configuration information may be installed in one or more of the Analyzers 104. At 504, the Probes 103 may provide flow information and statistics to the Analyzer(s) 104. By way of example, some of the flow information may pertain to on-going monitoring activities; other flow information may pertain to one or more flows that have terminated such that complete flow information and statistics are available. At 506, the Analyzer(s) 104 uses flow matching to uniquely associate events observed at various Probes 103 with a single flow instance, and performs a set of operations on the data based on the configuration data. At 508, the Analyzer(s) 104 may produce performance reports and provide them to interested parties. Such performance reports may include resulting QoS metrics and derived statistics.

Flow matching is an operation performed by the Analyzer 104 to associate observations of the Probes 104 at various points in the system with a flow instance. The key to this operation is using a window to eliminate any ambiguity that may exit when matching flows. For example, some protocols allow re-transmission of data packets or messages in the event of data loss, or time-outs at the sender. This may result in identical flow instances (e.g. data packets) traversing a Probe for multiple times. By using a time window, these re-transmitted data packets can be distinguished from the original transmissions.

In certain embodiments of this invention, flow matching may involve the following procedure— determine the flow instance that needs to be matched determine down stream Probes where the corresponding flow instance may appear determine a time window in an optimal way that considers the characteristics of the flow instance. The time window may starts at the time when the flow instance is observed at the probe with the duration specified by the size of such a window. The size (duration) of the time window should be a function of the application associated with the flow instance (steaming vs. file transfer), network segment characteristics (geographical distances, and link speed, etc.)

search all the flow instances falling into the time window at all the down stream Probes. If any records with the same Flow Identifier and Sequence Number are found, then a matching flow instance was obtained.

By matching flow instances, the Analyzers 104 are capable of associated various events with the flow instance of interest, and derive exhaustively all the network and server application QoS metrics.

Some QoS metrics that can be measured are presented as examples in Table I below.

TABLE I

| QoS Metrics | Description |
|---|---|
| CS Msg Jitter | Measures the jitter for packets within data messages being exchanged from the client to server. |
| SC Msg Jitter | Measures the jitter for packets within data messages being exchanged from the server to client. |
| CS Strm Jitter | Measures the jitter for data packets being transferred from the client to server. |
| SC Strm Jitter | Measures the jitter for data packets being transferred from the server to client. |
| CS ERT SS | Measures response time between the start of data messages from the client to the server and the start of their subsequent response data messages from the server to the client. |
| SC ERT SS | Measures the response time between the start of data messages from the server to the client and the start of their subsequent response data messages from the client to the server. |
| CS ERT ES | Measures the response time between the end of data messages from the client to the server and the start of their subsequent response data messages from the server to the client. |
| SC ERT ES | Measures the response time between the end of data messages from the server to the client and the start of their subsequent response data messages from the client to the server. |
| CS ERT SE | Measures the response time between the start of data messages from the client to the server and the end of their subsequent response data messages from the server to the client. |
| SC ERT SE | Measures the response time between the start of data messages from the server to the client and the end of their subsequent response data messages from the client to the server. |
| CS ART SS | Measures the response time between the start of application messages from the client to the server and the start of their subsequent application message responses from the server to the client. |
| SC ART SS | Measures the response time between the start of application messages from the server to the client and the start of their subsequent application message responses from the client to the server. |

TABLE I-continued

| QoS Metrics | Description |
| --- | --- |
| CS ART ES | Measures the response time between the end of application messages from the client to the server and the start of their subsequent application message responses from the server to the client. |
| SC ART ES | Measures the response time between the end of application messages from the server to the client and the start of their subsequent application message responses from the client to the server. |
| CS ART SE | Measures the response time between the start of application messages from the client to the server and the end of their subsequent application message responses from the server to the client. |
| SC ART SE | Measures the response time between the start of application messages from the server to the client and the end of their subsequent application message responses from the client to the server. |
| Conn Establish | Measures the number of connections established between the end-points. |
| Conn Graceful Term | Measures gracefully terminated connections both in volume and summary connection duration. |
| Conn Timeout Term | Measures previously established and timed-out connections both in volume and summary connection duration. |
| CS Conn Window | Measures the number of Transport-level packets containing windows from the client to server and their relative window sizes. |
| SC Conn Window | Measures the number of Transport-level Acknowledge data packets from the server to client and their relative window sizes. |
| CS Hop Count | Measures the Hop Count for Network-layer packets from the client to server. |
| SC Hop Count | Measures the Hop Count for Network-layer packets from the server to client. |

Examples of Computing QOS Metrics

Table II lists some examples, among others, that describe how some of the QoS metrics may be computed according to embodiments of the present invention.

| | |
| --- | --- |
| Number of Data Points | $N$ |
| Frequency | $\dfrac{N}{\text{TimeInterval}}$ |
| Maximum | $X_{max}$ |
| Minimum | $X_{min}$ |
| Range | $R = X_{max} - X_{min}$ |
| Arithmetic Mean | $\overline{X} = \dfrac{\sum X}{N}$ |
| Root Mean Square | $RMS = \sqrt{\dfrac{\sum (X^2)}{N}}$ |
| Variance | $\sigma^2 = \dfrac{\sum (X - \overline{X})^2}{N} = \dfrac{(\sum X^2) - 2\overline{X}(\sum X) + N(\overline{X}^2)}{N}$ |
| Standard Deviation | $\sigma = \sqrt{\dfrac{\sum ((X - \overline{X})^2)}{N}} = \sqrt{\dfrac{(\sum (X^2)) - 2\overline{X}(\sum X) + N(\overline{X}^2)}{N}}$ |
| Trending | $m = \dfrac{N\sum (IX) - (\sum I)(\sum X)}{N\sum (I^2) - (\sum I)^2}$ |

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. In a system having one or more distributed probes and one or more analyzers coupled to a network, a method for network performance and server application performance monitoring in at least one of the probes, comprising:
    installing configuration information into the probe;
    detecting the arrival at the probe of a flow instance of interest based on the configuration information;
    determining with the probe whether the arriving flow instance is a new flow instance;
    if the arriving flow instance is a new flow instance, establishing with the probe a state associated with the flow instance;
    capturing, with the probe, relevant information associated with the flow instance;
    exporting the relevant information based on a configuration;
    determining whether an end of the flow instance has been reached;
    if the end of the flow instance has been reached, destroying the state and exporting the relevant information;
    if the end of the flow instance has not been reached, continuing to monitor the flow instance;
    installing configuration information in one or more of the analyzers; and
    providing at least one of flow information and statistics from one or more of the probes to one or more of the analyzers;
    wherein one or more of the analyzers use flow matching to uniquely associate events observed at various of the probes with a single flow instance, and perform a set of operations on data based on the configuration information;
    wherein the flow matching includes:
    determining a flow instance to be matched;
    determining one or more down stream probes where a corresponding flow instance is capable of appearing;
    determining a time window in a way that considers characteristics of the flow instance; and
    searching the flow instances falling into the time window at the down stream probes;
    wherein if any records characterized by the same flow identifier and sequence number are found, determining that a matching flow instance has been obtained.

2. The method of claim 1 wherein the relevant information associated with the flow instance includes one or more types of information chosen from the group consisting of: timestamps, probe identifiers, flow identifiers, sequence numbers, flow information and flow statistics.

3. The method of claim 1 wherein the flow instance includes one or more flow instances chosen from the group consisting of a single packet, a stream of packets that constitute a message and a stream of packets that constitute a session.

4. The method of claim 1 further comprising constructing a record from the captured flow information.

5. The method of claim 4 further comprising exporting the record to one or more of the analyzers, wherein the trigger for record export is based on the configuration.

6. The method of claim 1 wherein the configuration information includes one or more types of information chosen from the group consisting of flows that need to be monitored, flow instances that need to be captured, sets of performance metrics that need to be measured, and the trigger which governs when the information is exported.

7. The method of claim 1 wherein the configuration information installed on the analyzer includes one or more types of information chosen from the group consisting of flows that need to be monitored, flow instances that need to be captured, and sets of performance metrics that need to be measured.

8. The method of claim 1, wherein the flow information pertains to on-going monitoring activities.

9. The method of claim 1, wherein the flow information pertains to one or more flows that have terminated.

10. The method of claim 1 wherein one or more of the analyzers produce performance reports.

11. The method of claim 10 wherein the performance reports include QoS metrics and derived statistics.

12. The method of claim 11 wherein the QoS metrics include one or more metrics selected from the group of CS Msg Jitter, SC Msg Jitter, CS Strm Jitter, SC Strm Jitter, CS ERT SS, SC ERT SS, CS ERT ES, SC ERT ES, CS ERT SE, SC ERT SE, CS ART SS, SC ART SS, CS ART ES, SC ART ES, CS ART SE, SC ART SE, Conn Establish, Conn Graceful Term, Conn Timeout Term, CS Conn Window, SC Conn Window, CS Hop Count, and SC Hop Count.

13. The method of claim 11 wherein the derived statistics include one or more statistics selected from the group consisting of Number of Data Points, Frequency, Maximum, Minimum, Range, Arithmetic Mean, Root Mean Square, Variance, Standard Deviation, Trending.

14. The method of claim 1 further comprising, by matching flow instances, associating various events with the flow instance of interest, and deriving one or more network or server application QoS metrics.

15. A system having one or more distributed probes and one or more analyzers coupled to a network, a set of processor readable instructions executable on a processor of one or more of the probes, the instructions embodying a method for flow instance capturing in at least one of the probes, comprising:
   installing configuration information into the probe;
   detecting the arrival at the probe of a flow instance of interest based on the configuration information;
   determining with the probe whether the arriving flow instance is a new flow instance;
   if the arriving flow instance is a new flow instance, establishing with the probe a state associated with the flow instance;
   capturing, with the probe, relevant information associated with the flow instance;
   determining whether an end of the flow instance has been reached;
   if the end of the flow instance has been reached, destroying the state and exporting the relevant information; and
   if the end of the flow instance has not been reached, continuing to monitoring the flow instance;
   wherein flow matching is performed and includes:
   determining a flow instance to be matched;
   determining one or more down stream probes where a corresponding flow instance is capable of appearing;
   determining a time window in a way that considers characteristics of the flow instance; and
   searching the flow instances falling into the time window at the down stream probes;
   wherein if any records characterized by the same flow identifier and sequence number are found, determining that a matching flow instance has been obtained.

16. A processor readable medium having embodied therein a set of a set of processor readable instructions executable on a processor of one or more probes in a system having one or more distributed probes and one or more analyzers coupled to a network, the instructions embodying a method for flow instance capturing in at least one of the probes, the method comprising:
   installing configuration information into the probe;
   detecting the arrival at the probe of a flow instance of interest based on the configuration information;
   determining with the probe whether the arriving flow instance is a new flow instance;
   if the arriving flow instance is a new flow instance, establishing with the probe a state associated with the flow instance;
   capturing, with the probe, relevant information associated with the flow instance;
   determining whether an end of the flow instance has been reached;
   if the end of the flow instance has been reached, destroying the state and exporting the relevant information; and
   if the end of the flow instance has not been reached, continuing to monitoring the flow instance;
   wherein flow matching is performed and includes:
   determining a flow instance to be matched;
   determining one or more down stream probes where a corresponding flow instance is capable of appearing;
   determining a time window in a way that considers characteristics of the flow instance; and
   searching the flow instances falling into the time window at the down stream probes;
   wherein if any records characterized by the same flow identifier and sequence number are found, determining that a matching flow instance has been obtained.

17. A method, comprising:
   detecting a flow instance;
   determining whether the flow instance is a new flow instance;
   if the arriving flow instance is a new flow instance, establishing a state associated with the flow instance; and
   capturing flow information associated with the flow instance;
   wherein the flow matching is utilized to associate events with the flow instance;
   wherein the flow matching includes:
      determining a flow instance to be matched,
      determining one or more locations where a matching flow instance is capable of appearing,
      determining a time window associated with the flow instance to be matched, and searching a plurality of flow instances associated with the time window at the one or more locations;
   wherein, if data characterized by the same flow identifier and sequence number are found, indicating that a matching flow instance has been identified.

* * * * *